(12) United States Patent
Cleodolphi (10) Patent No.: US 9,867,333 B2
(45) Date of Patent: Jan. 16, 2018

(54) METHOD AND SYSTEM OF OPERATING AN AUTOMOTIVE HARVESTER

(71) Applicant: CNH Industrial America LLC, New Holland, PA (US)

(72) Inventor: Daenio Cleodolphi, Piracicaba (BR)

(73) Assignee: CNH Industrial America LLC, New Holland, PA (US)

( * ) Notice: Subject to any disclaimer, the term of this patent is extended or adjusted under 35 U.S.C. 154(b) by 65 days.

(21) Appl. No.: 15/239,412

(22) Filed: Aug. 17, 2016

(65) Prior Publication Data

US 2017/0049051 A1   Feb. 23, 2017

(51) Int. Cl.
| | |
|---|---|
| *A01D 41/12* | (2006.01) |
| *A01D 45/10* | (2006.01) |
| *A01D 34/66* | (2006.01) |
| *A01D 34/80* | (2006.01) |
| *A01D 61/00* | (2006.01) |
| *A01D 43/08* | (2006.01) |
| *A01D 41/127* | (2006.01) |
| *A01D 101/00* | (2006.01) |

(52) U.S. Cl.
CPC ......... *A01D 41/1274* (2013.01); *A01D 34/66* (2013.01); *A01D 34/80* (2013.01); *A01D 43/085* (2013.01); *A01D 45/10* (2013.01); *A01D 61/008* (2013.01); *A01D 2101/00* (2013.01)

(58) Field of Classification Search
CPC .... A01D 41/1274; A01D 45/10; A01D 34/66; A01D 61/008; A01D 43/085; A01D 34/80; A01D 2101/00
See application file for complete search history.

(56) References Cited

U.S. PATENT DOCUMENTS

| | | | |
|---|---|---|---|
| 3,470,681 A | 10/1969 | Seamann | |
| 3,609,947 A | 10/1971 | Herbsthofer | |
| 4,487,002 A | 12/1984 | Kruse et al. | |
| 5,326,320 A | 7/1994 | von Allwoerden | |
| 6,076,340 A * | 6/2000 | Fowler | A01D 45/10 56/13.3 |
| 6,315,658 B1 * | 11/2001 | Weber | A01D 41/127 460/6 |
| 6,591,591 B2 * | 7/2003 | Coers | A01D 41/127 460/6 |
| 7,872,587 B2 | 1/2011 | Hindryckx et al. | |
| 9,119,346 B2 * | 9/2015 | Vergote | A01D 45/10 |
| 2005/0150202 A1 * | 7/2005 | Quick | A01D 41/127 56/10.2 R |
| 2010/0307121 A1 * | 12/2010 | Marchini | A01D 75/28 56/63 |

(Continued)

*Primary Examiner* — Thomas Ingram
(74) *Attorney, Agent, or Firm* — Peter K. Zacharias; Patrick M. Sheldrake (57) ABSTRACT

A method and system of operating a machine harvester that presents an improved solution for preventing clogging. There is provided simultaneous measurement of at least a parameter of a base-cutting set, of at least a parameter of a chopping assembly, and of a position of at least a floating roller of a conveyance system. Based on comparisons of the parameters measured and reference values, during a predefined time interval, it is possible to manage a propulsion speed of the machine harvester and to manage a rotation speed of cutting disks of the base-cutting set and of billet-cutting blades of the chopping assembly.

13 Claims, 3 Drawing Sheets

(56) References Cited

U.S. PATENT DOCUMENTS

| | | | |
|---|---|---|---|
| 2014/0274238 A1* | 9/2014 | Bernard | A01D 45/10 460/123 |
| 2014/0277961 A1* | 9/2014 | Blank | G05B 13/0275 701/50 |
| 2015/0331408 A1* | 11/2015 | Richard | A01D 45/10 700/114 |
| 2016/0205869 A1* | 7/2016 | Wenzel | A01D 41/127 |

* cited by examiner

METHOD AND SYSTEM OF OPERATING AN AUTOMOTIVE HARVESTER

CROSS REFERENCE TO RELATED APPLICATION

This application claims priority to Brazilian Application No. 1020150200706, filed Aug. 20, 2015, the contents of which are incorporated herein by reference.

FIELD OF THE INVENTION

The invention pertains to a method of operating an automotive harvester and, more particularly, to a method dedicated to mitigating situations of clogging of the harvester during the harvest of a vegetable crop. The invention also pertains to a system of operating an automotive harvester capable of enabling the implementation of the method of operating an automotive harvester.

BACKGROUND OF THE INVENTION

As known to persons skilled in the art, the state of the art comprises a plurality of models of automotive harvesters, and each one of these models presents different technical-constructive characteristics that are especially suited to the most varied harvest needs.

Figure 1:
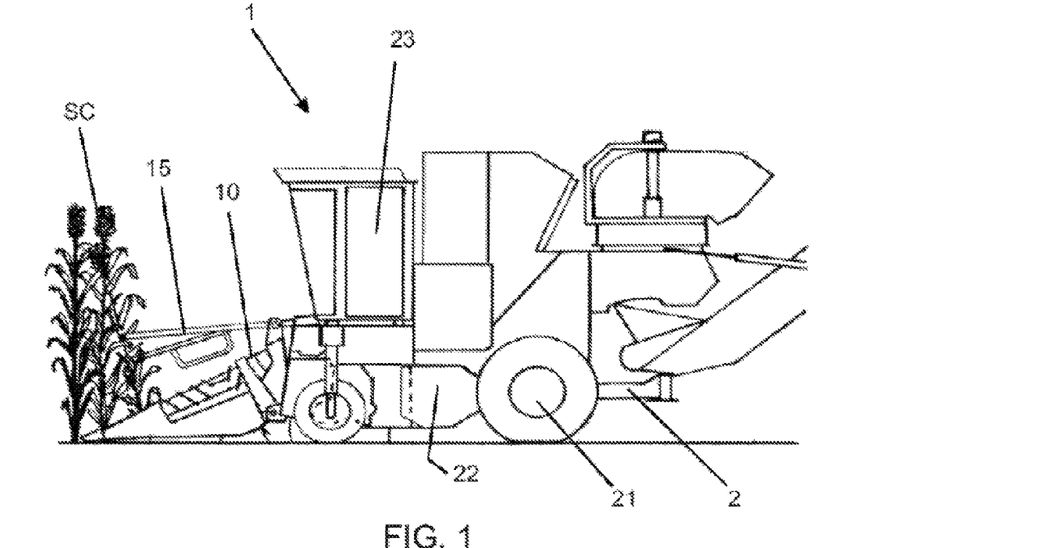
FIG. 1 schematically illustrates a side view of a conventional automotive sugar cane harvester.
Figure 2:
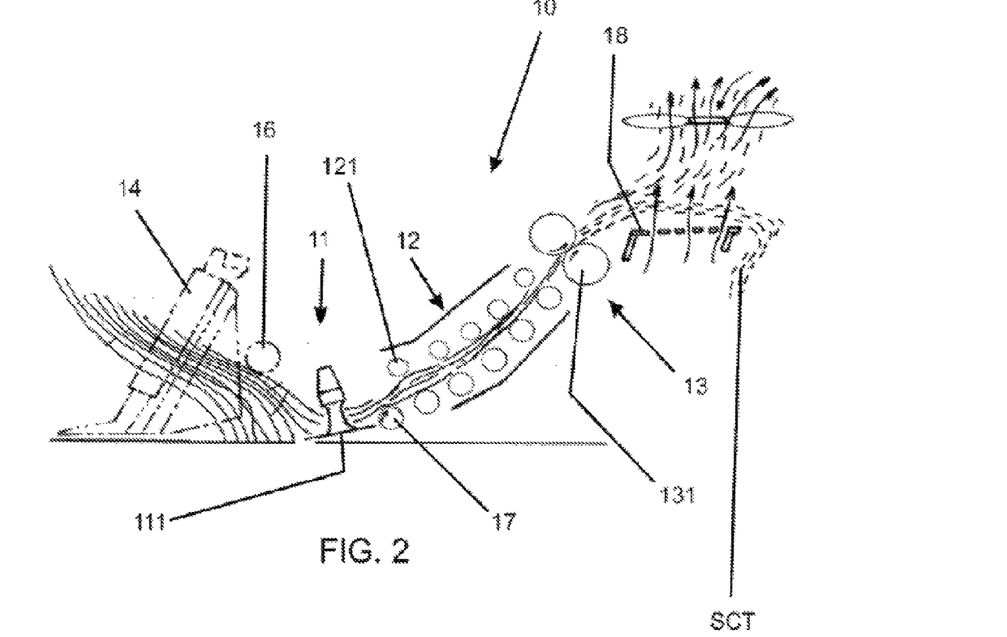
FIG. 2 schematically and in simplified form illustrates the elements that make up the conventional sugar cane harvester, from cutting the plant up to conveyance and chopping.

In the case of sugar cane harvesters, and drawing reference to FIGS. 1 and 2, they are typically arranged to gather sugar cane plants planted in SC lines and comprise a knockdown bar 15 or a top cutter, row dividers 14, one or more knockdown rollers 16, base cutting disks 111, at least a raising roller 17, a set of conveyance rollers 12 and chopping rollers 13, which cut the stalk of the sugar cane into more or less uniform billets having an approximate length of 200 to 300 mm. The residues that are gathered jointly with the cane are separated by way of an extractor 18 and the billets SCT are dispensed for transport, such as a transshipment dumper (not shown).

The elements that make up a sugar cane harvester, as well as the workings thereof, such as illustrated in FIGS. 1 and 2, are well known by persons skilled in the art.

It is also widely known by persons skilled in the art that automotive harvesters, such as, for example, sugar cane harvesters, are liable to clogging, that is, the build-up of vegetable crop and other waste, such as earth, stones etc. at the mouth of the machine or along the conveyance rollers or even in the chopping rollers, hampering the adequate flow of the material gathered. In this regard, it is worth emphasizing that clogging may occur due to different factors, such as, for example, the erroneous setting of the harvest parameters (such as too high or too low a speed) or due to the characteristics of the vegetable crop itself, as well as soil and climate.

In any case, it is known that during harvesting, a sugar cane harvester may sustain clogging due to the unexpected amount of cane, waste, or other elements, obliging the operator to stop the machine and clean it, causing wastage of work hours and thus compromising productivity.

Bearing in mind this scenario, the state of the art discloses some attempts to prevent or mitigate the clogging of automotive harvesters.

Document U.S. Pat. No. 3,470,681 describes, for example, a control system applicable in automotive harvesters that includes a variable speed unit connected to the conveyance system. This variable speed unit enables the control of the speed of the elements comprised within the conveyance system in accordance with the characteristics of the vegetable crop and, especially, in accordance with the thickness of the vegetable crop, which can be measured in accordance with the spacing between the floating rollers in said conveyance system.

Document U.S. Pat. No. 3,609,947 describes, for example, an automotive harvester whose conveyance system comprises an electric switch liable to activation based on the volume of vegetable matter gathered. Once activated (likely due to clogging), said electric switch activates solenoids, and this activation triggers the reduction of the automotive speed of the harvester and increases the speed of harvest treating assembly.

Document U.S. Pat. No. 6,315,658 describes, for example, an automotive harvester which, in order to maintain a substantially constant crop flow to the crop processing assembly, notwithstanding a variation in the crop amount (likely clogging), comprises a control circuit capable of controlling the propulsion speed of the harvester and/or the speed of the components within the conveyance system. This control is based on crop flow data obtained by a sensor that detects the speed and/or crop amount, and by a fill sensor associated with a buffer which temporarily accumulates the crop at the location upstream from the crop processing arrangement.

Although the state of the art comprises methods of operating automotive harvesters which, in one way or another, are designed to prevent or mitigate clogging or else keep the harvester working constantly, it is obvious that said methods foresee means of control (alteration of the propulsion speed of the harvester itself and/or alteration of the speed of the cutting module elements) only based on parameters directly or indirectly measured by the components comprised therein.

This limitation is highly negative. After all, such measurement is carried out at just one point of the harvester, and may result in diagnoses such as "false positive" (incorrect positioning of the floating rollers owing to various problems, without the occurrence of clogging) or "false negative" (correct positioning of the floating rollers, with the occurrence of clogging at other points of the machine).

SUMMARY OF THE INVENTION

In accordance with an aspect of the present invention, there is provided a method and system of operating a machine harvester that presents an improved solution to prevent clogging.

In accordance with another aspect of the present invention, there is provided a method and system of operating an automotive harvester capable of lowering the risk of clogging during the harvesting operation by accelerating the feed process and, contingently, also by reducing the propulsion speed of the automotive harvester per se.

It is desirable that the method and system of operating an automotive harvester be capable of preventing mistaken diagnoses, whereby altering certain functional parameters of the automotive harvester only when clogging (or start of clogging) is, in fact, detected.

In accordance with another aspect of the present invention, there is provided a method of operating an automotive harvester, which comprises the steps of: (B) measuring at least a parameter of the base-cutting set, (C) measuring at least a parameter of the chopping assembly, (D) measuring the positioning of at least one floating roller of the conveyance system, (E) comparing the amounts obtained in step (B) and in step (C) with reference values, during a pre-defined time interval, (F) comparing the amounts obtained in step (D) with reference values, during an arbitrarily pre-defined time interval, (G) managing the propulsion speed of the automotive harvester based on the result of the comparisons performed in step (E) and (H) managing the rotation speed of the two cutting disks of the base-cutting set and of the billet-cutting blades of the chopping assembly based on the result of the comparisons performed in step (F).

Particularly, the parameters measured in steps (B) and (C) comprise exertion parameters and, more particularly, exertion parameters obtained by reading the hydraulic pressure variation of the hydraulic drive mechanisms that drive the cutting disks of the base-cutting set and the billet-cutting blades of the chopping assembly. The parameters measured in steps (B) and (C) may also comprise exertion parameters obtained by reading the variation of the speed of the cutting disks of the base-cutting set and of the billet-cutting blades of the chopping assembly.

The step of managing the propulsion speed of the automotive harvester (G) may comprise at least one of the following executions: (G1) reducing the propulsion speed of the automotive harvester (1), or (G2) maintaining the propulsion speed of the automotive harvester (1), or (G3) accelerating the propulsion speed of the automotive harvester (1) until nominal cruising speed is resumed.

Particularly, execution (G1) occurs as of the moment at which it is verified that the reading values in step (B) or (C) of the base-cutting set and/or the parameters of the chopping assembly are greater than the reference data. Also particularly, execution (G2) occurs as of the moment at which it is verified that the parameters of the base-cutting set (11) and the parameters of the chopping assembly are equal to or less than the reference data, and that the automotive harvester is at cruising speed or below cruising speed.

In an exemplary embodiment, the step (H) comprises at least one of the following executions: (H1) accelerating the rotation speed of the cutting disks of the base-cutting set and of the billet-cutting blades of the chopping assembly, or (H2) maintaining the rotation speed of the cutting disks of the base-cutting set and of the billet-cutting blades of the chopping assembly, or (H3) reducing the rotation speed of the cutting disks of the base-cutting set and of the billet-cutting blades of the chopping assembly.

Particularly, execution (H1) occurs as of the moment at which it is verified that the positioning of at least one of the floating rollers of the conveyance system is greater than the reference data. Execution (H2) occurs as of the moment at which it is verified that the positioning of at least one of the floating rollers of the conveyance system is greater than the reference data, and that the rotation speed of the cutting disks of the base-cutting set and of the billet-cutting blades of the chopping assembly is equal to the nominal rotation speed. Execution (H3) occurs as of the moment at which it is verified that the positioning of at least one of the floating rollers of the conveyance system is greater than the reference data, and that the rotation speed of the cutting disks of the base-cutting set and of the billet-cutting blades of the chopping assembly is greater than the nominal rotation speed.

In accordance with still another aspect of the present invention, there is provided a an automotive harvester. The automotive harvester comprises at least a cutting module including at least a base-cutting set including at least two cutting disks, at least a conveyance system including at least a floating roller, at least a chopping assembly including at least two billet-cutting blades, at least an electronic management center including at least a processing core, at least a data-storage core, at least a sensor associated to the base-cutting set, at least a sensor associated to the conveyance system, at least a sensor associated to the chopping assembly and at least a sensor capable of measuring the speed of the automotive harvester, each of said sensors being capable of communicating with the electronic management center. Moreover, the automotive harvester further comprises at least a propulsion drive means of the automotive harvester, at least a drive means of the cutting disks of the base-cutting set and at least a drive means of the billet-cutting blades of the chopping assembly.

The automotive harvester excels wherein: the sensor associated to the base-cutting set relays data of the parameters of the base-cutting set to the electronic management center of the automotive harvester, the sensor associated to the conveyance system relays positioning data of at least one of the floating rollers of the conveyance system to the electronic management center of the automotive harvester, the sensor associated to the chopping assembly relays data of the parameters of the chopping assembly to the electronic management center of the automotive harvester, the processing core of the electronic management center compares the signals originating from the sensors and the reference data stored in the data-storage core of the electronic management center, the electronic management center controls the propulsion speed of the automotive harvester by the propulsion drive means of the automotive harvester and the electronic management center controls the rotation of the two cutting disks of the base-cutting set and of the billet-cutting blades of the chopping assembly through the driving means of the cutting disks of the base-cutting set and billet-cutting blades of the chopping assembly.

BRIEF DESCRIPTION OF THE DRAWINGS

The invention will now be described in greater detail based on the drawings listed below. These drawings are schematic, and their dimensions and/or proportions may not correspond to reality, as they are designed to describe an embodiment in a didactic manner, and do not impose any limitations other than those defined in the claims further ahead. Moreover, certain common and known elements have been omitted for didactic purposes for improved visualization of the object of the invention, wherein:

DETAILED DESCRIPTION OF THE INVENTION

FIG. 1 schematically illustrates an automotive harvester 1 known in the state of the art, such as a harvester commercialized by the mark Case IH, of CNH Global N.V. FIG. 2 represents the cutting elements, conveyance, chopping and extraction of vegetable matter gathered, such as sugar cane, cane energy and sweet sorghum. The harvester comprises a chassis 2 mounted on wheels or conveyor-belts 21, a drive engine 22, an operator cabin with controls 23, a cleaning system and, optionally, a billet-conveyor to transport the billets, for example, of sugar cane. These elements are well known in the state of the art.

FIG. 2 shows a schematic illustration and in simplified form of the elements that make up the cutting, conveyance, chopping and cleaning of the vegetable matter gathered that are mounted on a harvester, such as the one represented in FIG. 1. In this sense, a knockdown bar or rod 15 or a top cutter is upperly disposed to help knock down the plants or eliminate the vegetable matter from the top of the plants, which generally have low or no economic value, except in the case of cane energy. Row dividers 14 enable the delimitation or plantations lines to be harvested, while a knockdown roller 16 helps knock down the plants towards the inside of the machine. There are also provided a base cutter 11, chopping rollers 13 and a conveyance assembly 12 disposed between the base cutter 11 and the chopping rollers 13. Lastly, there is also provided an extractor 18 to separate the residues of the billets of sugar cane or sweet sorghum, and a billet conveyor to transport the billets for, for example, transshipment.

The base cutter 11 is normally disposed after the row dividers 14 and the knockdown roller 15, and comprises at least two cutting disks 111 capable of developing circular movement normally originating from hydraulic drive mechanisms. In this regard, it is also worth pointing out that, conventionally, the hydraulic circuit (not illustrated) that feeds the motor mechanisms that drive the cutting disks 111 further comprises at least a pressure sensor (not illustrated) capable of providing information relating to the hydraulic pressure from at least one point of said hydraulic circuit (not illustrated). The hydraulic circuit is fed by a tank containing hydraulic oil and pressurized by the force supplied by the motor 22.

In some known embodiments, the base cutter may also be disposed in the row dividers 14, and the drive of the cutting disks may be carried out by alternative means other than a hydraulic drive, such as a drive by electric motor or mechanically by way of a gearshift. In this sense, a sensor for measuring the power (torque and rotation) or at least the rotation of the cutting disk generally is also used, to enable both the rotation control of the cutting disk and to give information to the operator regarding any malfunction.

The chopping rollers 13 are generally disposed after the conveyance system 12 and comprise at least two rollers 131 having blades which, just like the cutting disks 111, are capable of developing circular movement normally originating from hydraulic drive mechanisms. Just as occurs at the base-cutting set 11, the hydraulic drive mechanisms of the rollers 13 are also fed by a hydraulic circuit (not illustrated) that also comprises at least a pressure sensor (not illustrated) capable of providing information relating to the hydraulic pressure from at least one point of said hydraulic circuit (not illustrated). These characteristics are known by persons skilled in the art. In the same way, alternatively, the chopping rollers may be driven by electric motors or mechanically by a gearshift and may equally comprise rotation sensors as replacement for or in conjunction with the hydraulic pressure sensors.

The conveyance system 12 is disposed between the base-cutting set 11 and the chopping assembly 13, and comprises a plurality of parallel rollers, and at least one of these rollers, generally the first roller disposed immediately after the base cutter, is a floating roller 121. Just as occurs with the cutting disks 111 and the chopping rollers 131, the parallel rollers of the conveyance system 12 are capable of developing circular movement by means of hydraulic drive mechanisms or equivalent, fed by a hydraulic circuit (not illustrated). It is also important to stress that said floating roller 121 is capable of presenting height displacement, thus varying the material entry mouth based on the amount of matter gathered, such as cane, foliage and other waste, such as earth, pebbles etc. Additionally, there may be provided at least a sensor associated to the floating roller 121, said sensor being capable of providing information relating to the displacement of variation in height of said roller. Again, the characteristics presented above and relating to the conveyance system 12 are known by persons skilled in the art.

The terms harvester, picker and other terms or equivalent terminologies are used indistinctly and refer to a machine designed to carry out the harvest, at least partially, of a vegetable crop.

Figure 3:
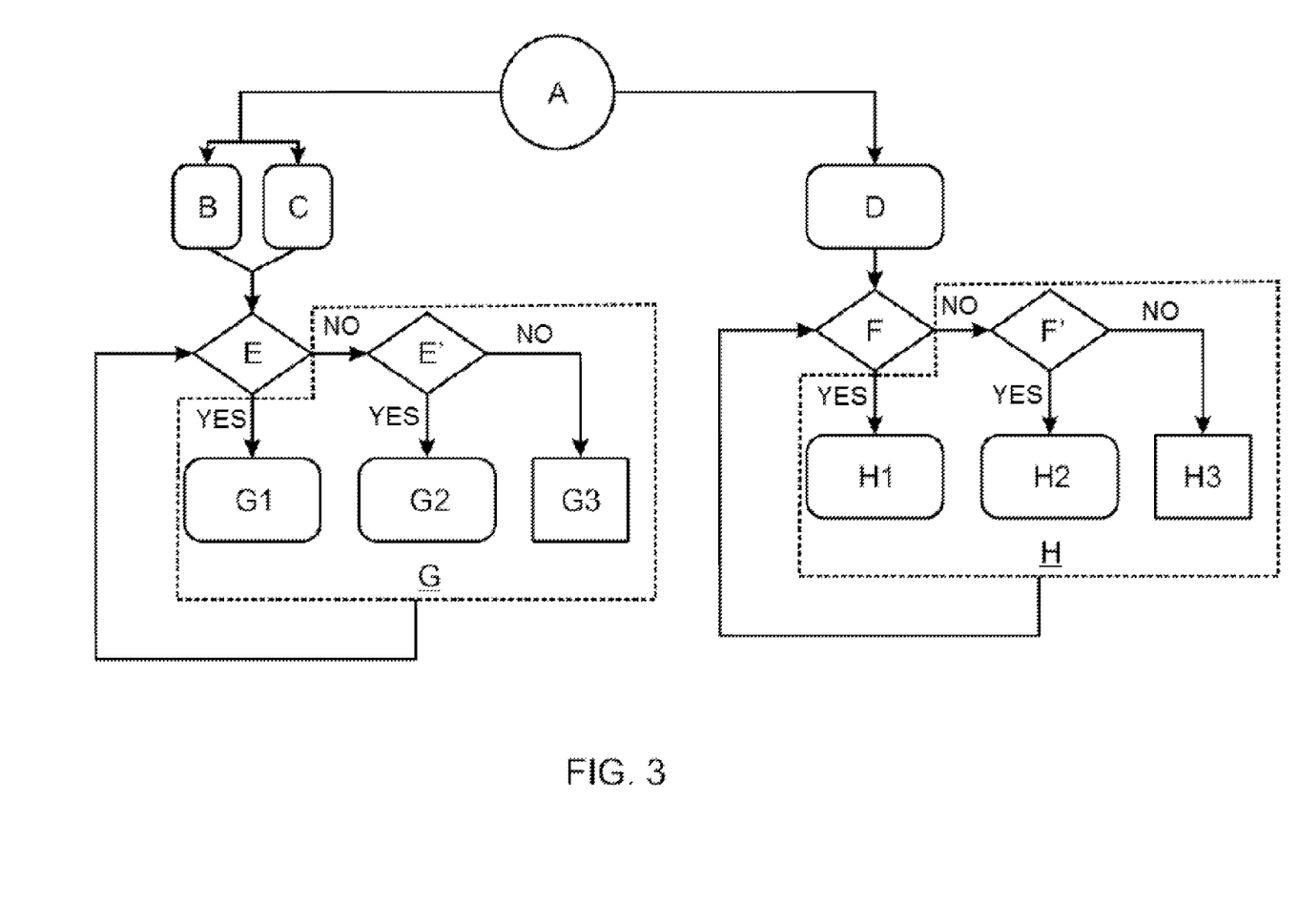
FIG. 3 illustrates a block diagram relating to a method of operating an automotive harvester, in accordance with an exemplary embodiment of the present invention.

In accordance with an exemplary embodiment of the present invention, there is provided a method of operating the automotive harvester which, as schematically illustrated in FIG. 3, is applicable particularly to an automotive harvester 1 for gathering sugar cane, cane energy, or sorghum, and the harvester comprises a base-cutting set 11, a chopping assembly 13 and a conveyance system 12 as previously described.

The method of operating the automotive harvester is designed to minimize or even eliminate situations of clogging.

According to an embodiment, the method carries out the steps of:

Step (B): Measuring at least a parameter of the base-cutting set 11. Among the parameters that can be measured are parameters related to the exertion that said base-cutting set 11 makes. Particularly, it is possible to measure parameters related to the hydraulic pressure variation of the motor mechanisms and/or by altering the speed of the cutting disks 111. After all, both the hydraulic pressure of the hydraulic drive mechanisms and the angular speed of the cutting disks 111 tend to vary based on the variation of exertion sustained by the cutting disk, which is also a function of the variations found in the field relating to the crop amount, soil type, existence of waste etc.

Step (C): In parallel and concomitantly, measuring at least a parameter of the chopping assembly 13, or at least one cutting roller of the chopping assembly, particularly, analogously to measuring step (B), that is, by measuring the variation of hydraulic pressure of the hydraulic drive mechanisms of the chopping roller or the speed variation of the roller 131.

Step (D): In parallel and concomitantly, measuring the positioning of at least one of the floating rollers 121 of the conveyance system 12, particularly, by way of a positioning sensor that can measure the variation in height of the floating roller 121.

As can be noted from FIG. 3, steps (B), (C) and (D) comprise, generally speaking, data generation steps of the automotive harvester 1, said data being real (data directly originating from reading the sensors) or emulated (data indirectly originating from reading the sensors). Consequently, said steps are dependent on sensors or equivalent means of generating external data.

Step (E): Comparing the data obtained in step (B) and in step (C) with reference data during a defined time interval. Both the data obtained in step (B) and the data obtained in (C) are compared with analog reference data, that is, if the data obtained in steps (B) and (C) are related to the hydraulic pressure, the reference data will also be data analogically equivalent to hydraulic pressure data. Just as the time interval, the reference data also are defined, and obviously may be calibrated automatically or by means of interaction of a user of the automotive harvester 1.

Step (F): Comparing the data obtained in step (D) with the reference data, during a defined time interval. The premises described in step (E) are equivalently applicable in said step (F).

Also as illustrated in FIG. 3, steps (E) and (F), in turn, comprise comparative data processing steps and, more particularly, steps whereby real data (directs or indirect) are compared with reference data, that is, information previously stored. Consequently, said steps are dependent on processing nuclei (microprocessors or microcontrollers) and also, particularly, on data storage nuclei (memory). It is worth emphasizing that said nuclei normally exist in the electronic control center of the automotive harvester 1 or in peripheral systems.

Step (G): Managing the propulsion speed of the automotive harvester 1 based on the result of the comparisons performed in step (E), that is, the electronic control center of the automotive harvester 1 managerially executes the control of the propulsion speed of the automotive harvester 1 (based on the results of comparing the data obtained in step (B) and in step (C) with the reference data, during an arbitrarily defined time interval, as proposed in step (E)) by way of already known managerial means such as, for example, the feed of a controller cooperating with the propulsion unit of the automotive harvester 1.

Step (H): Managing the rotation speed of the cutting disks 111 of the base-cutting set 11 and of the billet-cutting blades 131 of the chopping assembly 13 based on the result of the comparisons performed in step (F), that is, the electronic control center of the automotive harvester 1 managerially executes the control of the rotation speed of the cutting disks 111 of the base-cutting set 11 and of the billet-cutting blades 131 of the chopping assembly 13 (based on the results from the comparison between the data obtained in step (D) and the reference data, during an arbitrarily defined time interval, as proposed in step (F)) by way of already known managerial means such as, for example, the feed of a controller cooperating with the hydraulic drive mechanisms of the cutting disks 111 and of the billet-cutting blades 131.

Further based on FIG. 3, steps (G) and (H) both refer to alternative execution steps whose alternatives per se are connected with the processing steps, that is, to steps (E) and (F), respectively.

Thus, in step (G), managing the propulsion speed of the automotive harvester 1 may consist of:

Execution (G1): Reducing the propulsion speed of the automotive harvester 1;

Execution (G2): Maintaining the propulsion speed of the automotive harvester 1; and Execution (G3): Accelerating the propulsion speed of the automotive harvester 1 until nominal cruising speed is resumed (operating speed of the automotive harvester 1).

Execution (G1) occurs as of the moment at which it is verified that the functional parameters (in particular, exertion parameters) of the base-cutting set 11 or the functional parameters of the chopping assembly 13 are greater than the reference data. Further particularly, the propulsion speed of the automotive harvester 1 is reduced, at least, by about 10% of its nominal speed at each execution cycle of said method, and, at most accumulated, up to 50% of its nominal speed.

Executions (G2) and (G3) have the same objective, namely to make the automotive harvester 1 resume its nominal cruising speed. Consequently, executions (G2) and (G3) may occur as of the moment at which it is verified that the functional parameters (particularly, exertion parameters) of the base-cutting set 11 or the functional parameters of the chopping assembly 13 are equal to or less than the reference values. If the automotive harvester 1 is already at nominal cruising speed, execution (G2) occurs, and if the automotive harvester 1 is at reduced nominal cruising speed, likely due to the prior occurrence of an execution (G1), execution (G3) occurs.

The choice between executions (G2) and (G3) can be defined by an additional comparative step (E'), which is designed to verify whether the real speed of the automotive harvester 1 is greater than or equal to the nominal cruising speed. Obviously, verifying the real speed of the automotive harvester 1 is carried out by already known means and, furthermore, already existing in conventional automotive harvesters.

In step (H), managing the rotation speed of the cutting disks 111 of the base-cutting set 11 and of the billet-cutting blades 131 of the chopping assembly 13 may consist of:

Execution (H1): Accelerating the rotation speed of the cutting disks 111 and of the billet-cutting blades 131;

Execution (H2): Maintaining the rotation speed of the cutting disks 111 and of the billet-cutting blades 131; and Execution (H3): Reducing the rotation speed of the cutting disks 111 and of the billet-cutting blades 131 until nominal rotation speeds are resumed.

Execution (H1) occurs as of the moment at which it is verified that the positioning of at least one of the floating rollers 121 of the conveyance system 12 is greater than the reference data. Particularly, the rotation speed of the cutting disks 111 and of the billet-cutting blades 131 is increased at an interval defined between 200 and 245 rpm.

Executions (H2) and (H3) have the same objective, namely to make the rotation speed of the cutting disks 111 and of the billet-cutting blades 131 resume nominal rotation speed. Consequently, executions (H2) and (H3) may occur as of the moment at which it is verified that the positioning of at least one of the floating rollers 121 of the conveyance system 12 is less than or equal to the reference data. Should the rotation speed of the cutting disks 111 and of the billet-cutting blades 131 be equal to the nominal rotation speed, execution (H2) occurs, and if the rotation speed of the cutting disks 111 and of the billet-cutting blades 131 is greater than the nominal rotation speed, likely due to the prior occurrence of an execution (H1), execution (H3) occurs.

The choice between executions (H2) and (H3) can be defined by an additional comparative step (F'), which is designed to verify whether the real speed of the rotation of the cutting disks 111 and of the billet-cutting blades 131 is greater than or equal to the nominal rotation speed. Obviously, verifying the real rotation speed of the cutting disks 111 and of the billet-cutting blades 131 is carried out by already known means and, furthermore, already existing in conventional automotive harvesters.

Further according to a particular embodiment of the invention in question, both in step (E) and in step (F), the arbitrarily defined time interval is from 1 to 5 seconds. In addition, and still considering the particular embodiment of the invention where the parameters measured in steps (B) and (C) are pressure parameters and the positioning measured in step (D) is a linear variation parameter, it is worth emphasizing that the reference data of step (E) are defined at an interval between 100 and 170 bar and the reference data of step (F) correspond to amounts higher than 100 millimeters. Moreover, the measurements taken in steps (B), (C) and (D) comprise an average of at least 100 readings of said pressure sensors and linear displacement sensor.

Once there is a definition of the minimum fundamental steps for the method of operating the automotive harvester, in addition to certain contingent details of its particular embodiment, it becomes clear how said method is fully capable of improving the mitigation or minimization of clogging situations.

In its first logical branch—steps (B), (C), (E) and (G)—the method is capable of reducing or maintaining (in relation to the cruising speed) the cruising speed of the automotive harvester 1 based solely on exertion parameters of the sets 11 and 13. It is thus possible to diminish gradually and automatically the speed of the automotive harvester 1 in accordance with the increase in exertion of the sets 11 and 13. This means that preventive measures are immediately taken based on the mere sign of a clogging situation.

In its second logical branch—steps (D), (F) and (H)—the method is capable of increasing or maintaining (in relation to the nominal speed) the rotation speed of the cutting disks 111 and of the billet-cutting blades 131 based solely on positioning parameters of at least one of the floating rollers 121. It is thereby possible to increase gradually and automatically the rotation of the cutting disks 111 and of the billet-cutting blades 131. This means that preventive measures are immediately taken based on the mere sign of a clogging situation.

Since the execution of both logical branches of the method occur in continuous cycles (looping), the method now proposed is also capable of resuming normal conditions (cruising speed and rotation speed of the cutting disks 111 and of the billet-cutting blades 131) of the automotive harvester 1 without external interference.

Figure 4:
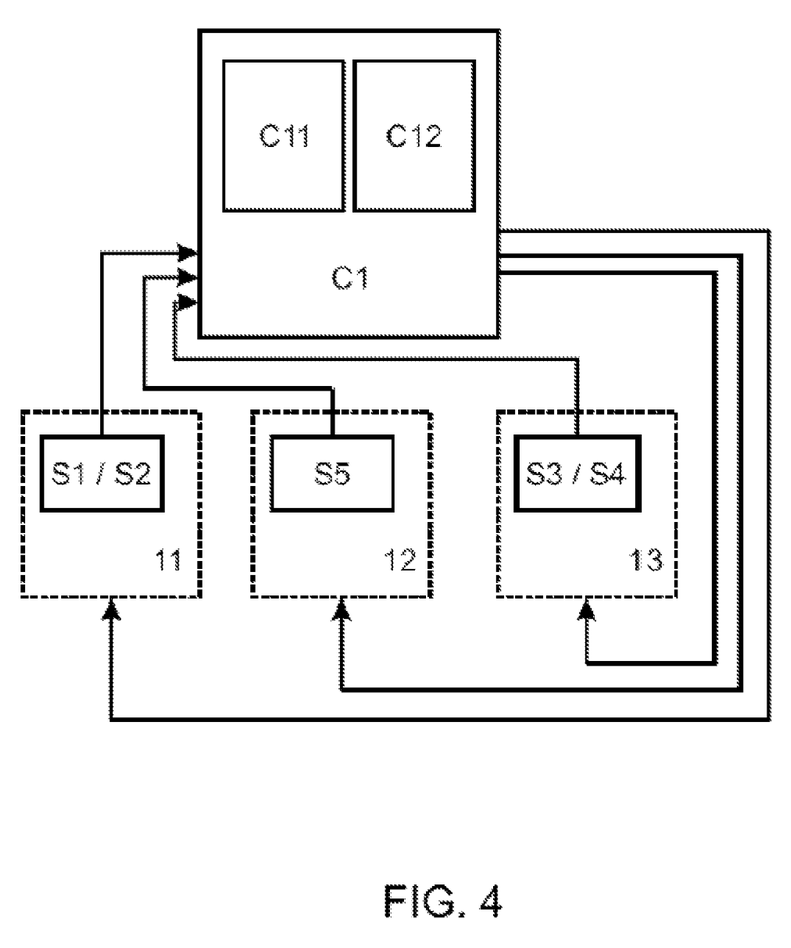
FIG. 4 schematically illustrates a system of operating an automotive harvester, in accordance with an exemplary embodiment of the present invention.

Referring now to FIG. 4, there is illustrated a system for executing the method described above, in accordance with an exemplary embodiment of the present invention. In short, the system for executing the method described above comprises the following components:

At least an electronic management center C1 based on a microprocessor or microcontroller, comprising at least a processing core C11 and at least a data-storage core C12.

At least a speed sensor S1 capable of measuring the speed of the cutting disks 111 of the base-cutting set 11 and of communicating with the electronic management center C1 and/or at least a pressure sensor S2 capable of measuring the pressure of the hydraulic drive mechanisms that drive the cutting disks 111 of the base-cutting set 11 and of communicating with the electronic management center.

At least a speed sensor S3 capable of measuring the speed of the billet-cutting blades 131 of the chopping assembly 13 and of communicating with the electronic management center C1 and/or at least a pressure sensor S4 capable of measuring the pressure of the hydraulic drive mechanisms that drive the billet-cutting blades 131 of the chopping assembly 13 and of communicating with the electronic management center.

At least a positioning sensor S5 capable of measuring the position or displacement of at least one of the floating rollers 121 of the conveyance system 12 and of communicating with the electronic management center C1.

At least a sensor S6 capable of measuring the speed of the automotive harvester 1 and of communicating with the electronic management center C1.

Moreover, said electronic management center C1, besides being capable of receiving the signals from the sensors and processing the steps of the method, is also capable of controlling the hydraulic drive mechanisms that drive the cutting disks 111 of the base-cutting set 11, the hydraulic drive mechanisms that drive the billet-cutting blades 131 of the chopping assembly 13 and the traction unit of the automotive harvester 1.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A method of operating an automotive harvester comprising a cutting module comprising a base-cutting set including at least two cutting disks, a conveyance system including a floating roller, and a chopping assembly including at least two billet-cutting blades, the method comprising steps of:
measuring a parameter of the base-cutting set;
measuring a parameter of the chopping assembly;
measuring a position of the floating roller of the conveyance system;
comparing the parameter of the base-cutting set and the parameter of the chopping assembly with a first reference value, during a pre-defined time interval;
comparing the measured position of the floating roller of the conveyance system with a second reference value, during a pre-defined time interval;
managing a propulsion speed of the automotive harvester based on a result of comparing the parameter of the base-cutting set and the parameter of the chopping assembly with the first reference value; and
managing a rotation speed of the at least two cutting disks of the base-cutting set and of the at least two billet-cutting blades of the chopping assembly based on the result of comparing the measured position with the second reference value.

2. The method of claim 1, wherein the parameter of the base-cutting set and the parameter of the chopping assembly comprise exertion parameters.

3. The method of claim 2, wherein the parameter of the base-cutting set and the parameter of the chopping assembly comprise exertion parameters obtained by reading a hydraulic pressure variation of hydraulic drive mechanisms that drive the at least two cutting disks of the base-cutting set and the at least two billet-cutting blades of the chopping assembly.

4. The method of claim 2, wherein the parameter of the base-cutting set and the parameter of the chopping assembly comprise exertion parameters obtained by reading a speed variation of the cutting disks of the base-cutting set and of the billet-cutting blades of the chopping assembly.

5. The method of claim 1, wherein the step of managing the propulsion speed of the automotive harvester comprises at least one of the following sub-steps:
reducing the propulsion speed of the automotive harvester;
maintaining the propulsion speed of the automotive harvester; or
accelerating the propulsion speed of the automotive harvester until nominal cruising speed is resumed.

6. The method of claim 5, wherein the sub-step of maintaining the propulsion speed of the automotive harvester is performed when the parameter of the base-cutting set or the parameter of the chopping assembly is greater than the first reference value.

7. The method of claim 5, wherein the sub-step of maintaining the propulsion speed of the automotive harvester is performed when the parameter of the base-cutting set and the parameter of the chopping assembly are equal to or less than the first reference value, and that the automotive harvester is at cruising speed.

8. The method of claim 5, wherein the sub-step of maintaining the propulsion speed of the automotive harvester is performed when the parameter of the base-cutting set and the parameter of the chopping assembly are equal to or less than the first reference value, and that the automotive harvester is below cruising speed.

9. The method of claim 1, wherein the step of managing the rotation speed of the at least two cutting disks of the base-cutting set and of the at least two billet-cutting blades of the chopping assembly comprises at least one of the following sub-steps:
   accelerating the rotation speed of the least two cutting disks of the base-cutting set and of the least two billet-cutting blades of the chopping assembly;
   maintaining the rotation speed of the least two cutting disks of the base-cutting set and of the least two billet-cutting blades of the chopping assembly; or
   reducing the rotation speed of the least two cutting disks of the base-cutting set and of the least two billet-cutting blades of the chopping assembly.

10. The method of claim 9, wherein the sub-step of accelerating the rotation speed of the least two cutting disks of the base-cutting set and of the least two billet-cutting blades of the chopping assembly is performed when the position of the floating roller of the conveyance system is greater than the second reference value.

11. The method claim 9, wherein the sub-step of maintaining the rotation speed of the least two cutting disks of the base-cutting set and of the least two billet-cutting blades of the chopping assembly is performed when the position of the floating roller of the conveyance system is greater than the second reference value, and that the rotation speed of the at least two cutting disks of the base-cutting set and of the at least two billet-cutting blades of the chopping assembly is equal to a nominal rotation speed.

12. The method claim 9, wherein the sub-step of reducing the rotation speed of the least two cutting disks of the base-cutting set and of the least two billet-cutting blades of the chopping assembly is performed when the position of the floating roller of the conveyance system is greater than the second reference value, and that the rotation speed of the at least two cutting disks of the base-cutting set and of the at least two billet-cutting blades of the chopping assembly is greater than a nominal rotation speed.

13. A system of operating an automotive harvester comprising:
   a cutting module comprising a base-cutting set including at least two cutting disks;
   a conveyance system including a floating roller;
   a chopping assembly including at least two billet-cutting blades;
   an electronic management center comprising a processing core and a data-storage core;
   a sensor associated with the base-cutting set;
   a sensor associated with the conveyance system;
   a sensor associated with the chopping assembly;
   a sensor capable of measuring a speed of the automotive harvester, wherein each of the sensors are configured for communicating with the electronic management center;
   a propulsion drive;
   a drive of the at least two cutting discs of the base-cutting set;
   a drive of the at least two billet-cutting blades of the chopping assembly,
   wherein the sensor associated with the base-cutting set relays data comprising parameters of the base-cutting set to the electronic management center,
   wherein the sensor associated with the conveyance system relays positioning data of the floating roller of the conveyance system to the electronic management center,
   wherein the sensor associated with the chopping assembly relays data comprising parameters of the chopping assembly to the electronic management center,
   wherein the processing core of the electronic management center compares signals originating from the sensors and to reference data stored in the data-storage core of the electronic management center,
   wherein the electronic management center controls a propulsion speed of the automotive harvester by the propulsion drive, and
   wherein the electronic management center controls rotation of the at least two cutting disks of the base-cutting set and of the at least two billet-cutting blades of the chopping assembly by the drive of the at least two cutting disks of the base-cutting set and the at least two billet-cutting blades of the chopping assembly.

* * * * *